US008504448B2

United States Patent
Shaw et al.

(10) Patent No.: US 8,504,448 B2
(45) Date of Patent: Aug. 6, 2013

(54) OUTGOING RETURNS PROCESSING

(75) Inventors: L. Edward Shaw, Dallas, TX (US);
Patricia Anne Sullivan Fleming, Brea, CA (US); Martin T. Mulligan, Gloversville, NY (US); Marcus Eugene McGinnis, Denver, NC (US); Karl R. Johnson, Scituate, MA (US); Thomas D. Thibault, Medford, MA (US)

(73) Assignee: Bank of America Corporation, Charlotte, NC (US)

( * ) Notice: Subject to any disclaimer, the term of this patent is extended or adjusted under 35 U.S.C. 154(b) by 954 days.

(21) Appl. No.: 12/605,785

(22) Filed: Oct. 26, 2009

(65) Prior Publication Data
US 2011/0099094 A1 Apr. 28, 2011

(51) Int. Cl.
*G07B 17/00* (2006.01)
*G07F 19/00* (2006.01)
*G06K 9/18* (2006.01)
*G06Q 40/00* (2012.01)

(52) U.S. Cl.
CPC ............... *G06Q 40/00* (2013.01); *G06Q 40/10* (2013.01)
USPC .................. 705/30; 705/35; 705/40; 705/44; 705/45; 382/182; 382/305

(58) Field of Classification Search
CPC ......... G06Q 40/00; G06Q 40/02; G06Q 40/10; G06Q 20/102; G06Q 20/10; G06K 9/18; G06K 9/186
USPC ............. 705/30, 35, 44, 45, 17, 40; 382/182, 382/305; 707/694
See application file for complete search history.

(56) References Cited

U.S. PATENT DOCUMENTS

| 8,249,396 B2* | 8/2012 | Axtell et al. ................... 382/305 |
| 2005/0171899 A1* | 8/2005 | Dunn et al. ...................... 705/39 |
| 2006/0080240 A1* | 4/2006 | Mersky ............................ 705/40 |
| 2007/0288381 A1* | 12/2007 | Doran ............................... 705/45 |
| 2007/0288382 A1* | 12/2007 | Narayanan et al. ............. 705/45 |
| 2008/0069481 A1* | 3/2008 | Axtell et al. ................... 382/305 |
| 2008/0208727 A1* | 8/2008 | McLaughlin et al. .......... 705/35 |
| 2008/0294541 A1* | 11/2008 | Weinflash et al. .............. 705/35 |
| 2010/0063927 A1* | 3/2010 | Davis et al. ..................... 705/44 |
| 2010/0205063 A1* | 8/2010 | Mersky ............................ 705/17 |
| 2010/0262522 A1* | 10/2010 | Anderson et al. ............... 705/30 |
| 2010/0332385 A1* | 12/2010 | Mersky ............................ 705/40 |
| 2012/0136782 A1* | 5/2012 | Norman et al. ................. 705/40 |

OTHER PUBLICATIONS

"Checkclear's Endpoint Exchange Network Adds Synovus to its Membership Roster." Business Wire: 1. Business Dateline; Hoover's Company Profiles; ProQuest Central. Feb. 17, 2004. Web. Dec. 1, 2012.*

(Continued)

*Primary Examiner* — Scott Zare
*Assistant Examiner* — Olusegun Goyea
(74) *Attorney, Agent, or Firm* — Michael A. Springs; Moore & Van Allen PLLC; Padowithz Alce

(57) ABSTRACT

Methods, systems, apparatuses and/or computer program products are directed to outgoing returns processing. The outgoing returns processing includes receiving outgoing returns data files, where the outgoing returns data files may be of a plurality of different file formats and received from a plurality of different channels. The outgoing returns processing further includes converting the outgoing returns data files to a platform file format and retrieving image files based on the outgoing returns data files. The outgoing returns are then settled.

27 Claims, 3 Drawing Sheets

OTHER PUBLICATIONS

"CheckClear's Endpoint Exchange Network Partners with the National Clearing House to Print Image Replacement Documents—IRDs—for Non-Image-Exchange Items." Business Wire: 1. Business Dateline; Hoover's Company Profiles; ProQuest Central. Jul. 2, 2004. Web. Dec. 1, 2012.*

* cited by examiner

OUTGOING RETURNS PROCESSING

BACKGROUND

In the marketplace, customers can pay for products or services with a personal check. However, sometimes these checks are not honored by the paying institution of the check writer ("the payor") because, for example, to pay the check would exceed available funds, a stop-payment has been placed on the check, the check involves misappropriation or the like. As such, the check must be processed appropriately and efficiently by the paying institution via flexible systems and methods.

SUMMARY

In accordance with an embodiment of the present invention, a method is directed to outgoing returns processing. The outgoing returns processing includes receiving outgoing returns data files, where the outgoing returns data files may be of a plurality of different file formats and received from a plurality of different channels. The outgoing returns processing further includes converting the outgoing returns data files to a platform file format. Image files are received based on the outgoing returns data files and the outgoing returns are settled.

In accordance with another embodiment of the present invention, an outgoing returns system includes at least one processing device. The processing device is configured to receive outgoing returns data files for outgoing returns, where the outgoing returns data files may be of a plurality of file formats and can be received from a plurality of channels. The processing device is further configured to convert the outgoing returns data files to a platform file format and retrieve image files based on data from the outgoing returns data files in the platform file format. The processing device is yet further configured to electronically process the outgoing returns based on the image files.

In accordance with another embodiment of the present invention, an apparatus includes at least one processing device configured to receive outgoing returns data files, where the at least one processing device is configured to accept outgoing returns data files of a plurality of different file formats and via a plurality of channels. The processing device also is configured to convert the outgoing returns data files to a platform file format and retrieve image files based on the outgoing returns data files.

In accordance with another embodiment of the present invention, a computer readable storage medium includes a computer program product embodied therein, the computer program product, when executed on a computer causes the computer to receive outgoing returns data files, where the outgoing returns data files may be of a plurality of different file formats and received from a plurality of different channels; convert the outgoing returns data files to a platform file format; retrieve image files based on the outgoing returns data files; and settle the outgoing returns.

DETAILED DESCRIPTION

Figure 1:
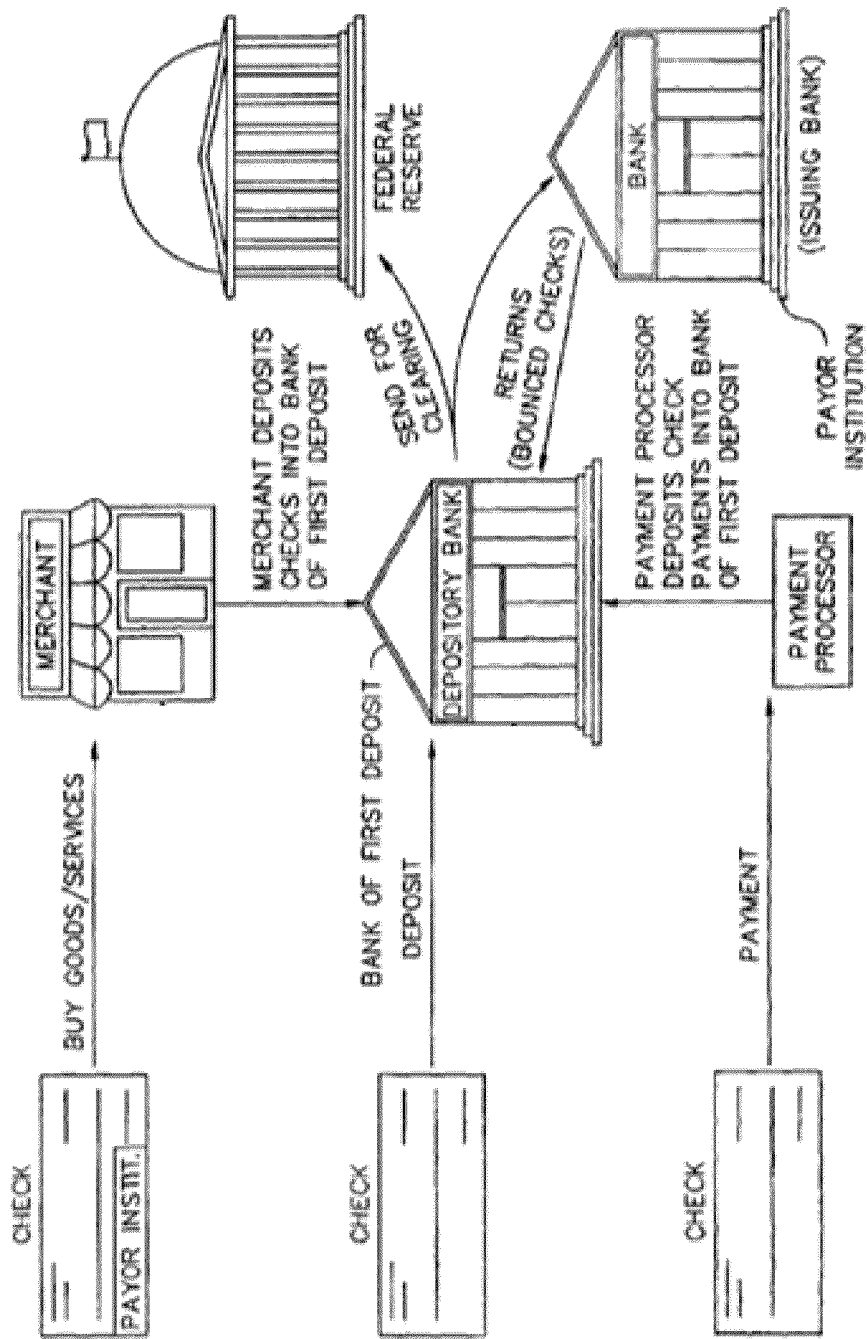
FIG. 1 illustrates an exemplary check clearing process.

Embodiments of the present invention are described below with reference to flowchart illustrations and/or block diagrams of methods and apparatuses (systems, computer program products, devices, etc.). It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create a mechanism for implementing the functions/acts specified in the flowchart and/or block diagram block or blocks.

These computer program instructions may also be stored or embodied in a computer-readable medium to form a computer program product that can direct a computer or other programmable data processing apparatus to function in a particular manner, such that the instructions stored in the computer readable memory produce an article of manufacture including instructions which implement the function/act specified in the flowchart and/or block diagram block(s).

Any combination of one or more computer-readable media/medium may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any medium that can contain, or store a program for use by or in connection with an instruction execution system, apparatus, or device.

A computer-readable signal medium may include a propagated data signal with computer program instructions embodied therein, for example, in base band or as part of a carrier wave. Such a propagated signal may take any of a variety of forms, including, but not limited to, electro-magnetic, optical, or any suitable combination thereof. A computer-readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

The computer program instructions may also be loaded onto a computer or other programmable data processing apparatus to cause a series of operation area steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention may take the form of an entirely hardware embodiment, an entirely software embodiment (including firmware, resident software, microcode, etc.) or an embodiment combining software and hardware aspects that may all generally be referred to herein as a "module," "apparatus," or "system."

The following detailed description refers to the accompanying drawings which illustrate specific embodiments of the invention. Other embodiments having different structures and operations do not depart from the scope of the present invention.

It should be understood that terms like "bank," "financial institution," and "institution" are used herein in their broadest sense. The term "financial institution" is intended to encompass all such possibilities, including but not limited to, banks, finance companies, stock brokerages, credit unions, mortgage companies, finance companies, companies, organizations which issue bills to consumers, organizations which pay bills on behalf of consumers, third party entities acting on behalf of the any of the above, etc. Additionally, disclosed embodiments may suggest or illustrate the use of agencies or contractors external to the financial institution to perform some or all of the calculations and data repository services. These illustrations are examples only, and an institution or business can implement the entire invention on their own computer systems or even a single work station if appropriate databases are present and can be accessed.

As a general overview, embodiments of the present invention provide a systematic method for processing outgoing return transactions drawn on banking accounts via a plurality of channels. Return decisions are performed in software applications, which output data files that outputs a file format that is not aligned to the outgoing returns system (e.g., IRE). The software applications create a return file during and at the end of the decision process and sends return data file(s) to an automated application fee (AAF) platform of the outgoing returns system. The data and corresponding item image are loaded onto the AAF platform to be processed. The bank of first deposit (BOFD) routing transit number, which identifies the financial institution where the item was deposited, is entered into the outgoing returns system. Outgoing returns data and image files are created and routed through a "nationwide send" process for collection and disbursement to the Federal Reserves and direct image trading partner banks. These embodiments of the present invention are further described in more depth below.

The above process relates to check clearing and more particularly to processing of outgoing returns. Check clearing is the process of reconciling payments among parties associated with a check-based financial transaction. In some embodiments, checks are processed in the following manner: the entity to whom the check is made out ("the payee") deposits the check in her bank ("the bank of first deposit" or "the depository bank"). If the check writer's ("the payor") account is in the same bank, the check is labeled "on-us" and it is processed at the bank. Otherwise, the physical check travels, often via a financial intermediary, to the payor's institution or bank ("the paying institution"), and finally to the payor, who receives the checks and/or an account statement of the checks on a periodic basis, typically monthly. The checks that must travel (interbank transit checks) may be handled by multiple institutions.

It should be noted that the Figures disclosed herein depict paper check processing. However, there are other financial instruments, such as debit cards, electronic checks (echecks), and Automated Clearing House (ACH) debit system transactions, which are ultimately tied into the checking account of a payor institution, and thus are functionally equivalent to paper checks. For simplicity, both the descriptions of the present invention collectively refer to all of these types of financial instruments as "checks."

FIG. 1 shows examples of three conventional channels of check activity for use of the customer's checks. In one channel, a customer presents a check to a merchant to buy a product or service. The merchant, in turn, deposits the check into a "bank of first deposit," also known as the "depository bank." In a second channel, a customer deposits a check directly into a bank of first deposit—the check may or may not be drawn on the bank of first deposit. In a third channel, the customer makes a payment to a payment processor. Like the merchant, the payment processor, in turn, deposits the check into a bank of first deposit. The bank of first deposit sends all checks (other than its own) to be cleared to the Federal Reserve and/or directly to the payor institution (e.g., payor bank).

If the payor does not have available funds in her account to clear the check, or if the paying financial institution does not honor the check for other reasons (e.g., misappropriation, the check was cancelled, etc.), the unpaid check ("a return item") travels back to the bank of first deposit. The return item is a check that is returned unpaid by the paying (payor) institution for any reason to the bank of first deposit, such as for exceeding the available funds. These return items are reported back to the bank of first deposit in a "returns file." Return items that flow out of the payor institution are referred to as "outgoing returns," whereas return items that are received by a bank of first deposit are referred to as "incoming returns."

Figure 2:
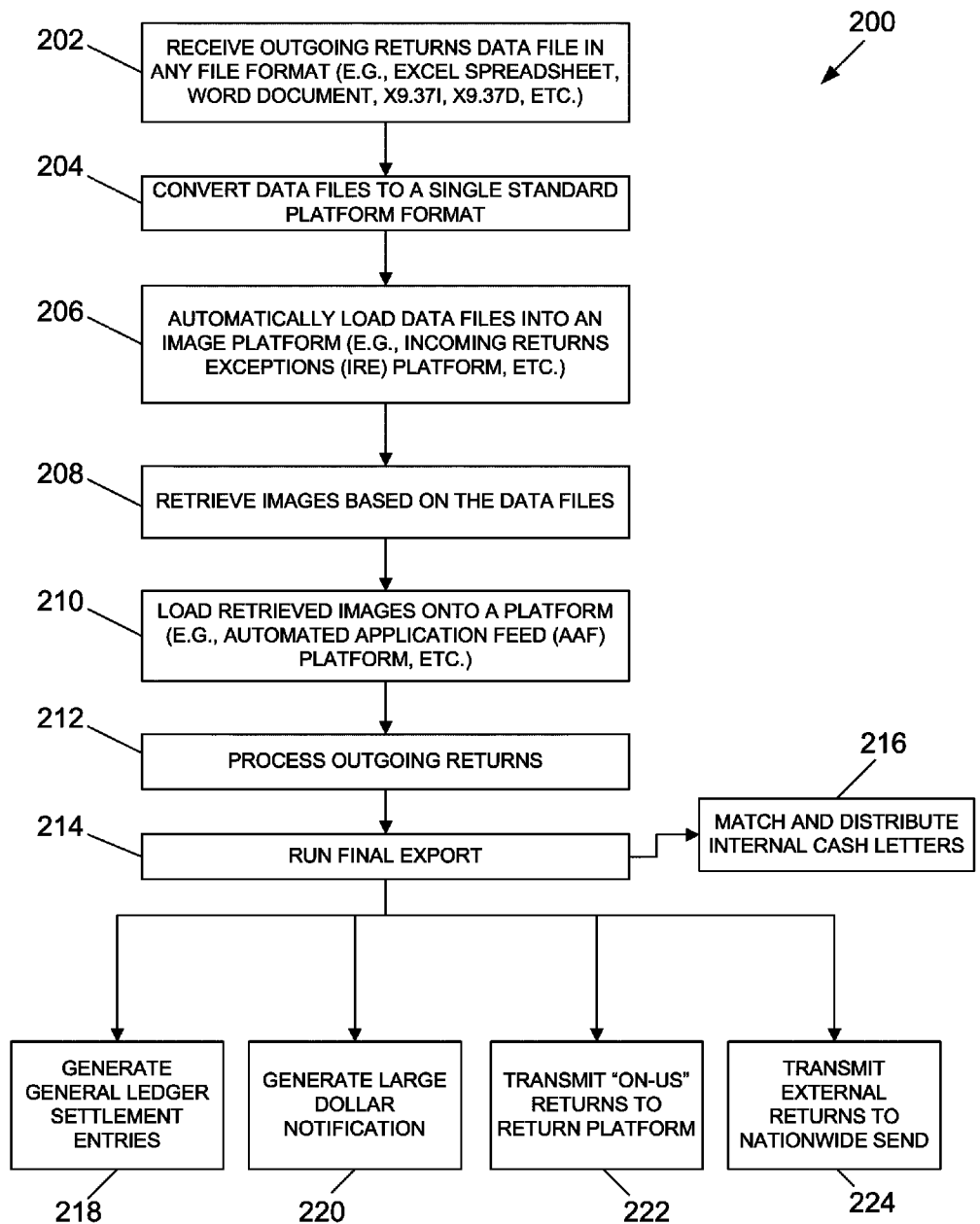
FIG. 2 is a flow chart of a method outgoing returns processing in accordance with some embodiments.

FIG. 2 illustrates a flow chart of an exemplary method 200 disclosed herein. The flow chart is divided into blocks illustrating actions or events that are undertaken by a financial institution, such as a bank, a third party, and/or any other entity. It will be understood that, unless clearly stated herein otherwise, in other embodiments the actions or events may be performed in a different order or simultaneously. Likewise, in some embodiments, one or more of the actions or events may be removed, optional, added, and/or combined with one or more other actions or events.

The method 200 disclosed in FIG. 2 may begin at block 202 where outgoing return data files are received. In one embodiment, the outgoing return data files are files that include data associated with a check or some equivalent thereof, where the check is associated with an outgoing return because the check was dishonored. The outgoing returns data files include data and/or image information about the check. In one embodiment, the data files may include image files. In other embodiments, the data files may include just check data, such as check numbers, transactional information, or any other data which allows for searchable identification of a check. The outgoing returns data files received may be in any file format, including formats which are unusable by an image platform (discussed later). For example, the data files may be a x9.37i file, a x9.37d file, a flat file, a Microsoft Word document, a Microsoft Excel spreadsheet, a manual entry into the system, a purely text document, or any other possible file format. The files are received through a plurality of channels, as is discussed later. Each channel relates to the path from which the data files are received from, such as from separate divisions or entities internally within a financial institution (e.g., Account Reconciliation (ARP), IDS, misappropriation, Northwest, California DDA, etc.), entities located outside of the financial institution (e.g., other banks, etc.), or any other possible means for receiving outgoing returns.

In block 204, the data files are converted to platform format. The platform format is a format that is operational and usable by the outgoing returns system (called Incoming Returns Exception ("IRE") image platform). Nonetheless, the outgoing returns data files are loaded onto a computer system and the format of these outgoing returns data files is automatically recognized by the computer system. The computer system then automatically converts the outgoing returns data files from any file format into the platform format so that the data files are usable by the IRE image platform. It should be noted that the computer system which converts the files may be part of IRE and should not be limited to a computer separate from the outgoing returns system.

After the data files are converted to the platform format, the converted outgoing returns data files are then automatically loaded onto the outgoing returns system (e.g., IRE), as illustrated in block 206. The outgoing returns system or IRE is a computer system that uses the outgoing returns data files to identify the bank of first deposit.

After the data files are loaded onto the outdoor returns server, the outgoing returns system then retrieves the images, as illustrated in block 208. In one embodiment, the outgoing returns system retrieves any images that are in the data files. In other embodiments, the outgoing returns system retrieves images from an image database or archive using data extracted from the converted data files. Such data that is extracted from the converted data files may include information such as the capture date, item sequence number, the date that the item was processed, the dollar amount, the account number, serial number, the payee name, the payor name, the check number, or any other information about the check or the transaction which may be helpful in searching for the image file of the check in the database or archive. For example, if an outgoing returns data file only has the amount of the check and the date the check was processed, but no other information about the check, the system can query the database for all items meeting such criteria and if only one check meets all the criteria, then the system will select that check image for processing/settlement.

After the images are retrieved, the images are then loaded onto the outgoing returns system, as shown in block 210. The images are loaded onto the outgoing returns system by any means such as transferring the images between computers, uploading the images from the database or other system, and the like.

In block 212, the outgoing returns are automatically processed. The outgoing returns are analyzed and if there's sufficient information from the image file that is loaded or the data from the converted data file, the bank of first deposit automatically identified. If there is not sufficient information to determine the bank of first deposit, the operator manually analyzes the image and/or corresponding data from the data file and determines the bank of first deposit and enters such information into the outgoing returns system. Additionally, if a large dollar notification is required, that information is also entered into the system, automatically or via the operator. Any additional information may also be entered into the system.

In block 214, a final export is run to generate cash letter information in response to identifying the bank of first deposit and/or the image files. The outgoing returns system will create outgoing cash letters that include all of the processed items, such as by matching the cash letters together as illustrated in block 216. The cash letter items will then be distributed via a nationwide send process. The nationwide send process determines which cash letter each item will be sent on.

The method 200 performs an automated settlement of the outgoing returns. A credit is to the customer account for the return and charge a specific suspense For example, in block 218, general ledger settlement statement entries are generated. A credit is generated to the customer account for the return and a specific suspense general ledger (GL) account is charged. The outgoing returns system or IRE will generate a credit back to this suspense GL account during the "end of day" process and generate appropriate debits to the general ledger accounts that support the return endpoint. This automated settlement process allows the settlement entries to be automatically prepared and processed as opposed to requiring associates to manually do so.

Further, as illustrated in block 224, any outgoing returns drawn on another bank are sent out through a nationwide send process to settle the outgoing return, such as electronically sending the outgoing return directly to the bank of first deposit or to the Federal Reserve. Any return items which are drawn "on-us" will be transmitted internally automatically to an incoming returns platform (e.g., IRX), as illustrated in block 222. The incoming returns platform (e.g., IRX) may be a platform that is separate from the outgoing returns system and processes the on-us returns separate from the outgoing returns, according to some embodiments. Additionally, a large dollar notification is generated in block 220 if any checks meet a pre-defined dollar amount threshold. The large dollar notification is provided to the bank and/or to the Federal Reserve in accordance with federal regulations.

Figure 3:
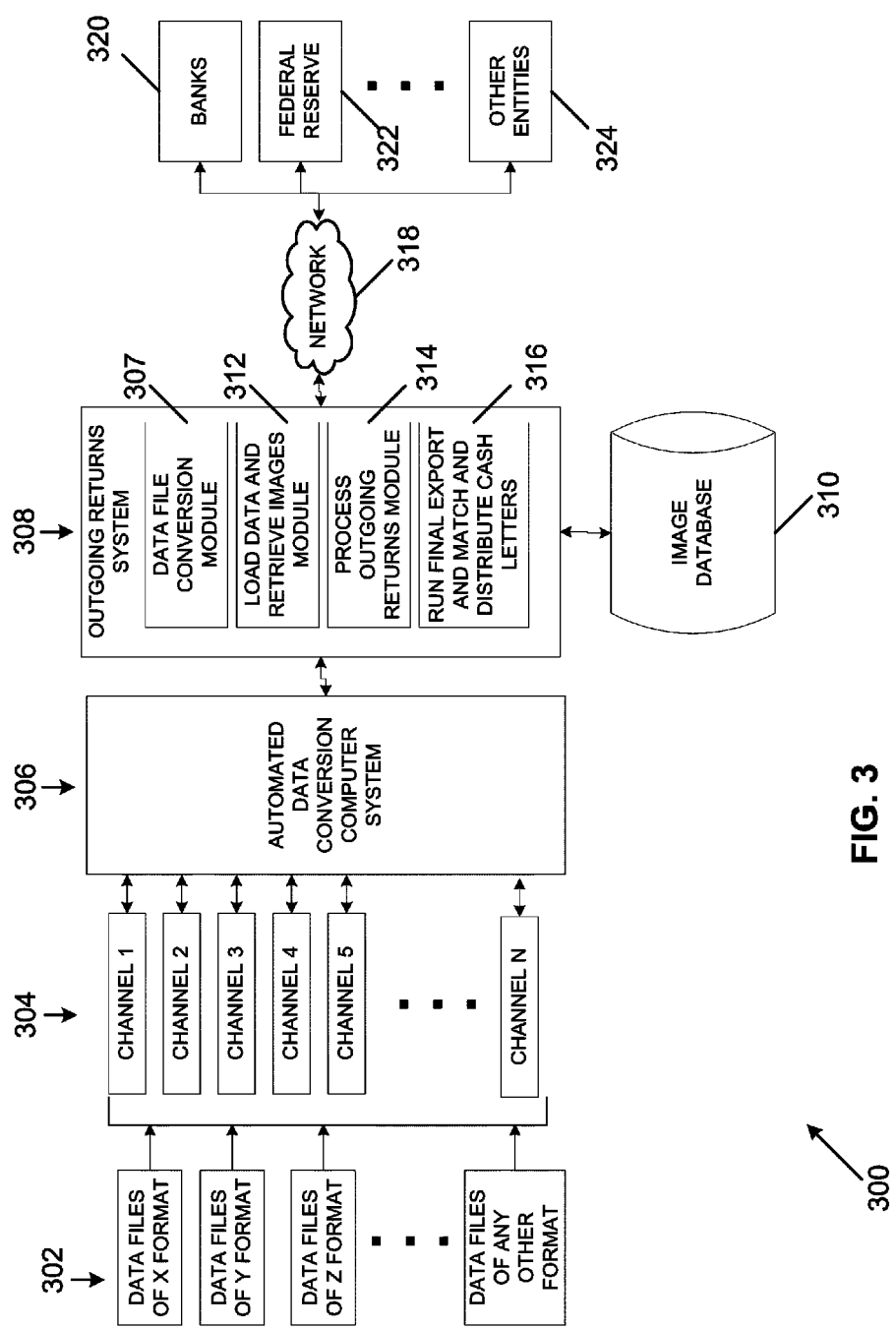
FIG. 3 is a block schematic diagram of an example system for outgoing returns processing in accordance with some embodiments.

FIG. 3 is a block schematic diagram of an exemplary system 300 for outgoing returns processing in accordance with some embodiments. As illustrated, data files 302 of any format are received via an unlimited amount of channels 304. As previously discussed, the channels 304 may be internal to the bank or channels 304 external to the bank. Nonetheless, the data files include image files and/or information to allow for archival retrieval of the image files. The data files 302 are received in an automated data conversion system 306, which may be part of the data conversion module 307 of the outgoing returns system 308 or a computer system 306 separate from the outgoing returns system 308. The automated data conversion system 306 automatically recognizes the data file format of each data file 302 and converts the data files 302 into a common platform format, as previously described. The converted data files are then processed in various modules of the outgoing returns system 308. It should be understood that the outgoing returns system 308 may be composed of a single server or a series of computers, where one or more of the modules may be operable on one or more of the computers of the system 308.

The outgoing returns system 308 may include various modules to perform functions as previously discussed. The data file conversion module 307 allows for conversion of the data files 302 to a standard platform format.

The outgoing returns system 308 may include a module to load data and retrieve images 312. The load data and retrieve images module 312 loads the outgoing returns data files onto the outgoing returns system 308 and also communicates with the image database 310. The image database 310 includes image files, and data associated with the image files, where the image files are images of checks used in transactions with the financial institution. As previously discussed, the outgoing returns system 308 may query and retrieve images files from the image database 310 based on data obtained from the outgoing returns data files 302.

The outgoing returns system 308 also includes a module for processing outgoing returns 314. The process outgoing returns module 314 processes the outgoing returns after being loaded onto the outgoing returns system 308. The process outgoing returns module 314 may optionally be a portion of the load data and retrieve images module 312.

The outgoing returns system 308 may also include a module for running final export and matching and distributing cash letters 316. Such module 316 facilitates automatic settlement of the outgoing returns and matches and distributes cash letters during such settlement process. Further, this module 316 also allows for communications over a computer network 318, such as the Internet, a private network (e.g., a intranet), or other network, to provide for communications with banks 320, the Federal Reserve 322, and other entities 324.

One or more steps of the method 200 may be performed using the system 300, and the method 200 may be continuously performed to automatically receive outgoing returns and automatically settle these returns in an inefficient manner. The method 200 and system 300 described herein allows for settlement between banks avoiding the expensive process of settlement using the Federal Reserve by obtaining the bank of first deposit information via the outgoing data files that are not in platform format. The method 200 has flexibility by allowing data files to be received in any file format possible, and through an infinite number of channels without manual human intervention to convert the data files to a format for the system 300. Additionally, the method 200 and system 300 allows for automatic settlement of the outgoing returns.

Various other features are within the scope of the present invention, including notices, assessments and credits to customer accounts. First, an exception notice file may be generated and sent to an application that prints the exception notices. The exception notice informs the customer of the returned transaction and any associate assessment. Second, a return assessment can be charged to the customer account. The return assessment will be sent to a transaction routing system that would route the assessment transaction to an application where the customer count recites. Third, with regard to credit to customer accounts, the outgoing returns system may generate a credit transaction to the customer account for the returned transaction. This will make the end-to-end process more efficient and reduce the manual effort performed by the line of business associates requesting the return.

While exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An outgoing returns processing system comprising:
   at least one processing device configured to:
      receive outgoing returns data files for outgoing returns, where the received outgoing returns data files are of a plurality of file formats received from a plurality of channels;
      determine a file format for each of the plurality of the outgoing returns data files;
      in response to the determining the file format, convert at least one of the outgoing returns data files to a predetermined image file format corresponding to a file format of a platform for processing outgoing returns image files in the predetermined image file format;
      retrieve image files based on data from the outgoing returns data files in the predetermined image file format; and
      electronically process the outgoing returns.

2. The apparatus of claim 1, wherein the at least one processing device is further configured to automatically generate automated general ledger settlement statements.

3. The apparatus of claim 1, further comprising a network, wherein the at least one processing device is further configured to electronically transmit, via the network, on-us returns to a returns platform for processing separate from the outgoing returns.

4. The apparatus of claim 1, further comprising a network, wherein the at least one processing device is further configured to electronically transmit, via the network, the outgoing returns to nationwide send.

5. The apparatus of claim 1, wherein the at least one processing device is further configured to match and distribute cash letters based on the image files and the outgoing return data files.

6. The apparatus of claim 1, wherein the at least one processing device is further configured to load the outgoing returns data files onto a processing platform in response to the converting the outgoing returns data files to the platform file format.

7. The apparatus of claim 1, wherein the plurality of file formats comprises a Microsoft Word format, a Microsoft Excel format, a x9.37i format, and a x9.37d format.

8. The apparatus of claim 1, wherein the plurality of channels comprises different divisions within a financial institution such that the outgoing returns data files are received via separate departments within the financial institution.

9. The apparatus of claim 8, wherein the plurality of channels further comprises an entity external to the financial institution so that the outgoing returns data files may be received via separate departments within the financial institution or via other financial institutions unaffiliated with the financial institution.

10. An apparatus comprising:
    at least one processing device configured to:
       receive outgoing returns data files, where the at least one processing device is configured to accept outgoing returns data files of a plurality of different file formats and via a plurality of channels;
       determine a file format for each of the plurality of the outgoing returns data files;
       in response to the determining the file format, convert at least one of the outgoing returns data files to a predetermined image file format corresponding to a file format of a platform for processing outgoing returns image files in the predetermined image file format; and
       retrieve image files based on the outgoing returns data files.

11. The apparatus of claim 10, wherein the at least one processing device is further configured to automatically settle the outgoing returns in response to retrieving the image files.

12. The apparatus of claim 11, further comprising a network, wherein the automatically settling the outgoing returns comprises sending the outgoing returns back to a bank of first deposit electronically via the network.

13. The apparatus of claim 11, further comprising a network, wherein the automatically settling the outgoing returns comprises sending the outgoing returns back to the Federal Reserve electronically via the network.

14. The apparatus of claim 10, wherein the plurality of file formats comprises a Microsoft Word format, a Microsoft Excel format, a x9.37i format, and a x9.37d format.

15. The apparatus of claim 10, wherein the plurality of channels comprises different divisions within a financial institution such that the outgoing returns data files are received via separate departments within the financial institution.

16. The apparatus of claim 15, wherein the plurality of channels further comprises an entity external to the financial institution so that the outgoing returns data files may be received via separate departments within the financial institution or via other financial institutions unaffiliated with the financial institution.

17. A method comprising:
receiving outgoing returns data files, where the outgoing returns data files are of a plurality of different file formats and received from a plurality of different channels;
determining a file format for each of the plurality of the outgoing returns data files;
in response to the determining the file format, converting, using a process device, at least one of the outgoing returns data files to a predetermined image file format corresponding to a file format of a platform for processing outgoing returns image files in the predetermined image file format;
retrieving image files based on the outgoing returns data files; and
settling the outgoing returns.

18. The method of claim 17, wherein the settling the outgoing returns occurs automatically in response to retrieving the image files.

19. The method of claim 17, wherein the settling the outgoing returns comprises generating automated general ledger settlement statements.

20. The method of claim 17, wherein the plurality of different file formats comprises a Microsoft Word format, a Microsoft Excel format, a x9.37i format, and a x9.37d format.

21. The method of claim 17, wherein the plurality of different channels comprises different divisions within a financial institution such that the outgoing returns data files may be received via separate departments within the financial institution.

22. The method of claim 17, wherein the plurality of channels further comprises an entity external to the financial institution so that the outgoing returns data files may be received via other financial institutions unaffiliated with the financial institution.

23. A computer readable storage medium comprising a computer program product embodied therein, the computer program product, when executed on a computer causes the computer to:
receive outgoing returns data files, where the outgoing returns data files may be of a plurality of different file formats and received from a plurality of different channels;
determine a file format for each of the plurality of the outgoing returns data files;
in response to the determining the file format, convert at least one of the outgoing returns data files to a predetermined image file format corresponding to a file format of a platform for processing outgoing returns image files in the predetermined image file format;
retrieve image files based on the outgoing returns data files; and
settle the outgoing returns.

24. The computer readable storage medium of claim 23, wherein the settling the outgoing returns comprises automatically generating general ledger settlement statements.

25. The computer readable storage medium of claim 23, wherein the receiving outgoing returns data files comprises receiving files of one of a Microsoft Word file format, a Microsoft Excel file format, a x9.37i file format, and a x9.37d file format.

26. The computer readable storage medium of claim 23, wherein the plurality of different channels comprises different divisions within a financial institution such that the outgoing returns data files may be received via separate departments within the financial institution.

27. The computer readable storage medium of claim 23, wherein the computer program product is further configured to match and distribute cash letters based on the image files and the outgoing return data files.

* * * * *